United States Patent
Conrad et al.

[11] Patent Number: 5,940,739
[45] Date of Patent: Aug. 17, 1999

[54] MULTIPLE ACCESS SATELLITE COMMUNICATIONS NETWORK

[76] Inventors: Charles Conrad; Thomas Ray Ingersoll; Carl Joseph Glim, all of 1501 Quail St., Suite 102, Newport Beach, Calif. 92660; David Earl Massey, 417 Caredean Dr., Suite A, Horsham, Pa. 19044

[21] Appl. No.: 08/957,643

[22] Filed: Oct. 24, 1997

[51] Int. Cl.⁶ .................................................. H04B 7/185
[52] U.S. Cl. .......................................... 455/13.1; 455/430
[58] Field of Search ................................ 455/12.1, 13.1, 455/3.2, 427, 430, 426

[56] References Cited

U.S. PATENT DOCUMENTS

| | | |
|---|---|---|
| 4,979,170 | 12/1990 | Gilhousen et al. ..................... 455/12.1 |
| 5,579,367 | 11/1996 | Raymond et al. ..................... 455/12.1 |
| 5,590,395 | 12/1996 | Diekelman .............................. 455/13.1 |
| 5,603,077 | 2/1997 | Muckle et al. .......................... 455/12.1 |
| 5,634,190 | 5/1997 | Wiedeman ............................ 455/12.1 |

*Primary Examiner*—Nguyen Vo
*Attorney, Agent, or Firm*—Kenyon & Kenyon

[57] ABSTRACT

The present invention relates to a means and a process of sharing a single system of ground stations between any number of satellite owners, permitting the owners to transfer command information to their satellite, and collect data streams that are sent back from the satellite all via a standardized global communications system maintained and operated by a commercial satellite communications company.

4 Claims, 3 Drawing Sheets

MULTIPLE ACCESS SATELLITE COMMUNICATIONS NETWORK

BACKGROUND OF THE INVENTION

This invention relates to an apparatus and process by which a plurality of users can communicate with a plurality of orbiting satellites via a communication network.

Every since the launch of Sputnik in 1957 and the resulting ground swell of science education that resulted, satellites and satellite technology have played a major role in the advancement of space and communication technology. All manner of communication signals, ranging from telephone, microwave, television and others can be transmitted over satellite communications links. In addition, a wide range of scientific and technical data can be gathered from specially equipment satellites designed to monitor weather and other physical phenomenon.

There are a two primary type of orbits that are used for communication satellites. The first is a geostationary (GEO) orbit. A satellite placed into a geostationary orbit, completes one revolution around the earth in exactly the same amount of time that it takes the earth to complete one revolution on its axis. Thus the satellite, though moving around the earth, appears to observers on the ground, to be fixed in space above the earth. A satellite in GEO orbit is approximately 22,300 miles above the earth. Even at the speed of light, the period of time that it takes to send and receive a radio signal over that distance (latency) is 0.24 seconds, which is unacceptably long for anything approaching real time transmission. In addition, the relatively long distance requires higher power transmitters, bigger antennas which means more weight and greater costs to produce and launch.

However, there are other advantages to a GEO orbit. From the relatively long distance from earth, a much larger area falls within reach of the transmitter. Thus, a small number of satellites can be used to provide coverage over all of the Earth's surface.

In order to solve the latency, which is critical to achieving a commercially successful operation, the satellites can be placed into a Low Earth Orbit (LEO) which is typically 500–1500 miles from earth. At this much shorted distance, the satellites orbit the Earth about once every ninety minutes. At LEO distance, the latency is on the order of hundredths of a second. With the satellites located about an order of magnitude closer to the Earth, the transmitter can be much smaller and lower powered. However, the surface area on the Earth that is in range of a transmitter of a satellite in LEO is much smaller than if the satellite were in a GEO orbit. Therefore, many more satellites need to be launched into orbit in order to provide sufficient surface area coverage.

When satellites first were used, almost all satellites were manufactured and launched by national governments. The cost was far too high for commercial ventures, particularly in light of the benefits which were small and the risks which were high. In the beginning, the infrastructure didn't exist to take advantage of the communications capabilities of satellites. Televisions was in its infancy and the enormous need for telecommunication that exists today hadn't even begun to develop.

However, as integrated circuit technology advanced, microprocessors became more powerful and memory prices plummeted, the cost to produce cellular phones, microwave transmitters, and other communications devices has radically decreased. This decrease in prices has led to an enormous increase in the market. All telephone area codes, assigned under an earlier set of rules, have been allocated and a new area code assignment scheme had be implemented in order to accommodate the rapid growth and the increase in phone numbers needed due to increased use of modems, facsimile machines, pagers, and of course telephones.

Now, that the market is of sufficient size, commercial entities can profitably operate in this market. A number of commercial companies have implemented their own satellite communication programs. As discussed earlier, the LEO orbits, which require smaller and less expensive satellites would require the launching of hundreds of commercially owned private satellites.

There are four major costs involved in a satellite communication network. These are manufacturing the satellite, launching the satellite, equipment and overhead to communicate with the satellite and general administrative overhead.

Initially, communication equipment requirements were met by companies building and maintaining their own ground-based communications stations. Depending on the type of orbit and the altitude of the satellite, the satellite will be in communication with a single fixed ground station for a only a few minutes during each rotation. If there was a need to communicate with the satellite for a longer period of time, then the company would have to either place more satellites in orbit or build more ground stations, in order to achieve communications for a longer period to time. This might require up to 6–8 ground stations at a cost of over $2.5 million per station. This figure represents a major cost of initiating a satellite based communication system.

An object of the present invention is to share a single satellite communication system among a number of users, thus eliminating the great expense of building and maintaining a private satellite communication system.

A further object of the invention is to provide a means for each user to directly communicate with a scheduling computer, and to transfer user data to the scheduling computer where user data from a number of users is coordinated, conflicts resolved, and data transferred to ground stations for ultimate uploading to the proper orbiting satellite.

A still further object of the invention is provide a means for the owner of the satellite to remotely communicate with the scheduling computer of the service provider in order to submit commands to be transmitted to the satellite and to receive data streams returned from the satellite and stored in the scheduling computer to be passed onto the user in real time or stored and forwarded to the user as a later time.

Yet another object of the invention is to provide a means for communication between a plurality of users and a plurality of ground stations or and a plurality of scheduling computers by way of communication over a global communication system using standardized software, such as the use of a Web browser to communicate with a Web server, over the internet.

SUMMARY OF THE INVENTION

The present invention relates to means and process of sharing a single system of ground stations between any number of satellite owners, permitting the owners to transfer command information to their satellite, and collect data streams that are sent back from the satellite all via a standardized global communications system.

The present invention includes a user interface means which allows the user to prepare data to be communicated to a satellite at the user's usual place of business. Usually, the data comprises a set of commands to be sent to a particular satellite which will cause a desired and expected response from the satellite. The data is then transmitted to a central control means. The data can be prepared ahead of time and the transmitted at one time to the central control means or the user can communicate online directly with the central control means and input the data directly to the central control means. In addition, the user can communicate with the central control means via an internet browser which communicates with a web page associated with the central control means. By one of the above described methods or any other way in which data can reasonably be transmitted to the central control means, a set of data, which includes such information as: which is the target satellite, from which ground station should the data be transmitted, during which pass of the target satellite should be utilized and should data be anticipated to be received during this pass from the satellite, is now stored at the central control means.

The central control means then transmits this data to one of the plurality of transmission means best suited to communicate with the specified satellite at the specified time.

The user interface means will commonly be a computer and more commonly a desktop computer.

The central control means will commonly be a computer and more commonly will be an engineering workstation.

The transmission means is usually comprised of a radio frequency transmitter, a radio frequency receiver and a transmission control means.

The instant invention also includes a process of acquiring data from a plurality of users, transmitting that data to a central control means which stores the data. Then identifying and resolving transmission, equipment communication link, and other scheduling conflicts, then transferring the data to transmitted to the ground station on an as needed basis. The ground station will transmit to the appropriate satellite, based upon the schedule established by the central control means, the data acquired from the user. If there is data download from the satellite during the same pass, that data is temporarily stored by the ground station and then transferred to the central control means and the particular user.

One means of communicating between the user and central control means and the transmission means, by using a web browser communicating over an internet connection to a web server that is programmed to store and display information about the satellites. This method of implementing communication between the user and the central control means is very effective because of the widespread access to the internet. There are a large number of independent internet service providers that make available to the internet very simple and easily accomplished just about anywhere in the world.

It is important to differentiate the use the internet as a physical communication means and the use of a web browser which interprets and implements Hyper Text Markup Language(or HTML) files. Though use of a web browser are currently the most popular way to communicate over the internet, there will certainly be major growth and changes in the software used to communicate over the internet. At some point people may no longer be using a web browser and its underlying HTML files, but may communicate using some completely different software protocol. Thus one aspect of the instant invention relates to communication over a global network in which utilizes a server computer which stores and implements a program written in a special communication language. The end user will be running a client version of that same software which will enable the end user to interact with the client computer receiving files of the special communication language, having those files interpreted by the client software and then viewing and reading the resulting presentation of text and graphics, inputting data, and having that data transmitted by the client software to the server compute via the internet network.

BRIEF DESCRIPTION OF THE DRAWINGS

The present invention will be described in further detail by reference to the accompanying drawings, in which.

DESCRIPTION OF THE PREFERRED EMBODIMENT

Figure 1:
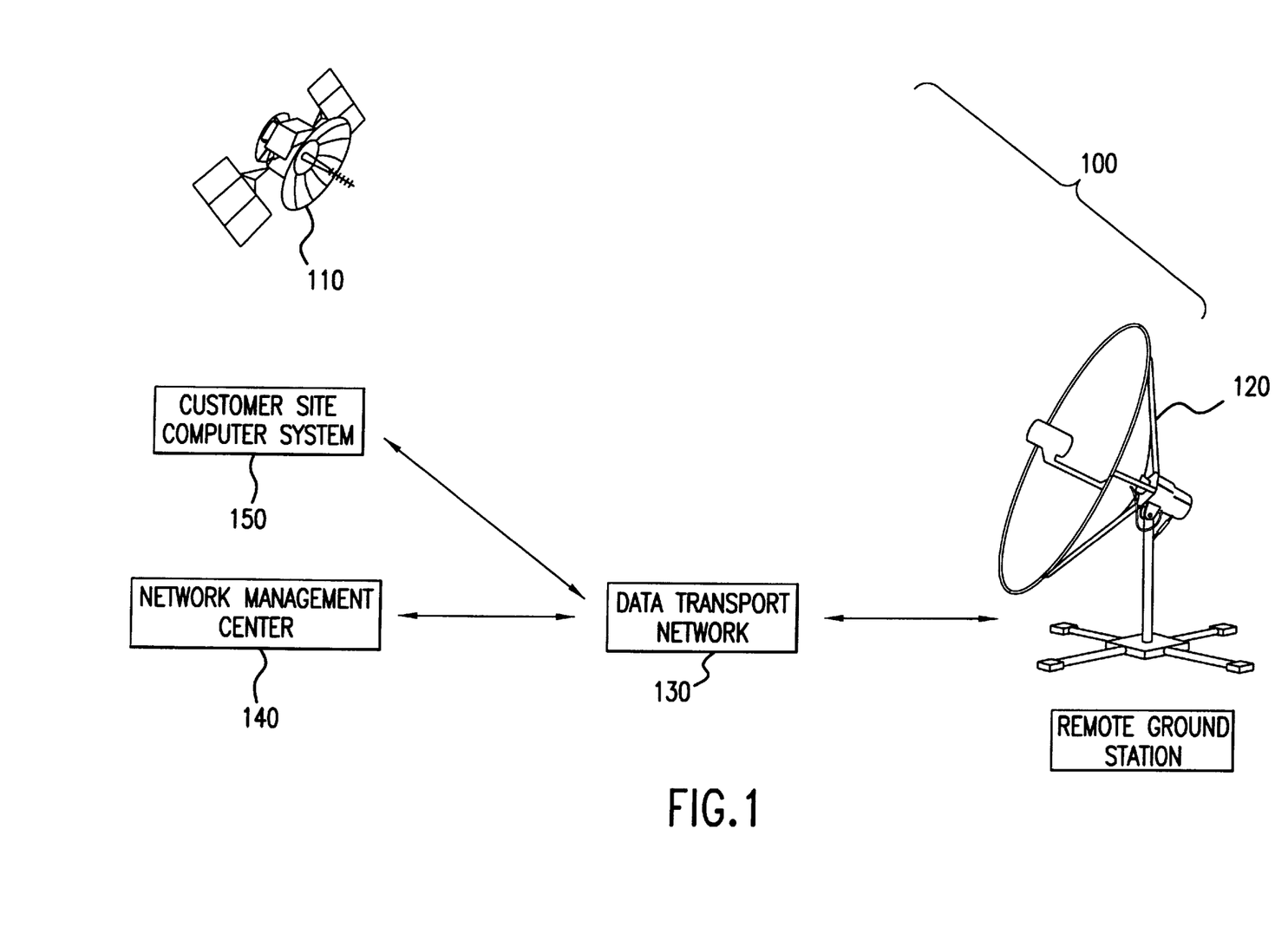
FIG. 1 is a schematic diagram of the instant invention.

Starting with FIG. 1, Multiple Access Satellite Communications Network 100 is shown in schematic view. Satellites 110 are a plurality of satellites launched and operated by customers of the service providers who own Multiple Access Satellite Communications Network 100. Satellites 110 are in digital communication with Remote Ground Station 120 during certain periods of the orbit of the satellite. Though shown in this figure as a single station, there can a plurality of stations located where needed to provide maximum available communication time with the satellites.

Remote Ground Station 120 is in digital communication with the Data Transport Network 130. Network Management Center 140 is in digital communication with Data Transport Network 130. Customer Site 150 is also in digital communication with Data Transport Network 130. Though shown in FIG. 1 as a single location, Customer Site 150 can be a plurality of sites from a number of independent satellite owners or users. Because each of Remote Ground Station 120, Network Management Center 140, and Customer Site 150 are in digital communication with Data Transport Network 130, each of the three locations may communicate with either or both of the other two locations.

Thus in normal operations, a user at Customer Site 150 can communicate with the Network Management Center 140 and transfer a series of commands to be transmitted to the intended target satellite. These commands are intended to effectuate required activity by the satellite in question, once the commands have been transmitted to the satellite. Such activity might include instructions to onboard cameras to acquire data from certain locations on earth, collect radios signals at certain frequencies or transmit back to earth certain data that has already been collected by the satellite. The commands are passed from the Customer Site 150 to the Network Management Center 140 and stored there.

The Network Management Center 140 will store all the commands from any number of Customer Site 150. The Network Management Center 140 has access to orbital data for all satellites in question and calculates which Remote Ground Station 120 is best situated to transmit the commands to the Satellites 110. Satellites 110 usually take about 90 minutes to orbit the earth, and during that 90 minutes, the satellite is properly positioned to transmit or receive data for only 10–15 minutes. Because the Remote Ground Station 120 can only communicate with one Satellites 110 at a time, scheduling the most efficient use of transmission time is critical. Network Management Center 140 also schedules all the requests and optimizes when and from what Remote Ground Station 120, each set of commands should be transmitted. If the command instructions call for data to be transmitted back to earth, the time when the data is ready and the period of time that it will take to retrieve the data are all taken into account Once the scheduling has been calculated, Network Management Center 140 will transmit over Data Transport Network 130 to Remote Ground Station 120 the information needed to handle each transmission and reception for each communication request.

Figure 2:
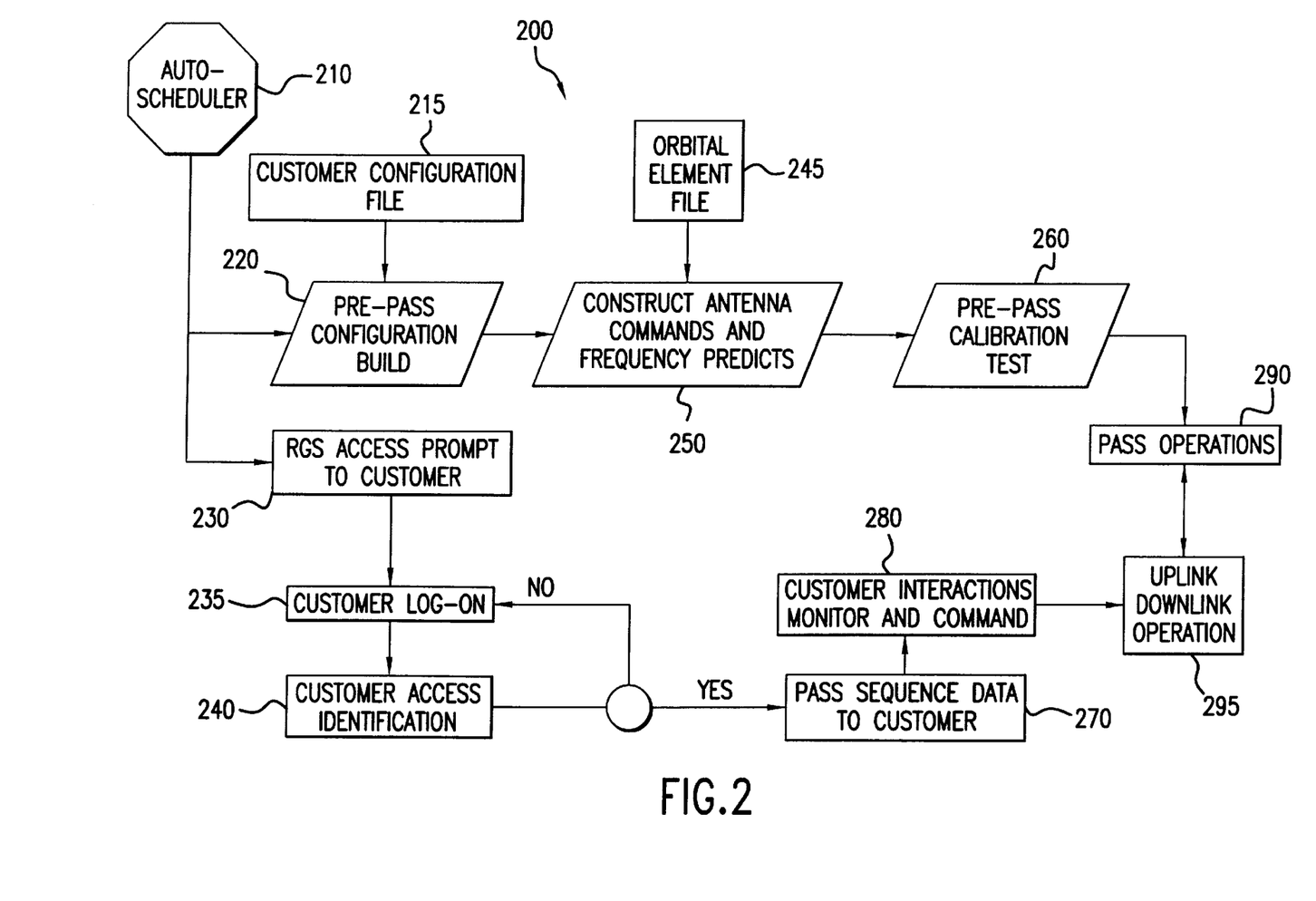
FIG. 2 is a flow chart showing the logic of events during an actual pass of a satellite and communication and events that take place during that pass.

Referring now to FIG. 2, a discussion of the events that take place at a remote ground station just prior to and during the pass of a satellite over a ground station. Starting on the left side of the flow chart, there is shown the Auto-Scheduler 210, which stores the schedule information and is part of the Network Management Center 140. A any time prior to a scheduled pass of a Satellites 110, Auto-Scheduler 210 passes instructions to the Remote Ground Station 120, to begin preparing to communicate with the scheduled satellite. Information needed to configure the Remote Ground Station 120, is stored in the Customer Configuration File 215. The data stored in Customer Configuration File 215 is transferred to the Pre-Pass Configuration Build 220 module. The Pre-Pass Configuration Build 220, utilizes the data obtained from Customer Configuration File 215 and sends the needed commands to the Construct Antenna Commands and Frequency Predicts 250 module. The Construct Antenna Commands and Frequency Predicts 250 module receives information from the Orbital Element file 245 in order properly initialize and configure the antenna and radio frequencies in order to communicate with the particular satellite.

After configuration, the system passes control to the Pre-pass Calibration test 260 module which performs a series of system checks just prior to the scheduled time for the satellite to appear within communication range. Once the Satellites 110 has risen far enough above the horizon, a communication link is established and the data that was input by the user at the Customer Site 150, is transmitted to the Satellites 110. If the input that was transferred to the satellite calls for immediate data collection, then data is returned via the S or X band downlink frequencies.

At the same time that the Auto-Scheduler 210 initiates the configuration activities, it also initiates the RGS Access Prompt to Customer 230. This module communicates over the Data Transport Network 130 with the Customer Site 150 and alerts the Customer Site 150 of the upcoming satellite pass. If the customer wishes to monitor the pass real time they can, otherwise, the software at the Customer Site 150 initiates a Customer Log-on 235. Once the Customer Log-on 235 is initiated, it communicates with the Customer Access Authentication 240 module. If the Customer Access Authentication 240 module recognizes the verification codes provided by the Customer Log-on 235 module, then data collected during the pass is transmitted back to the customer.

Figure 3:
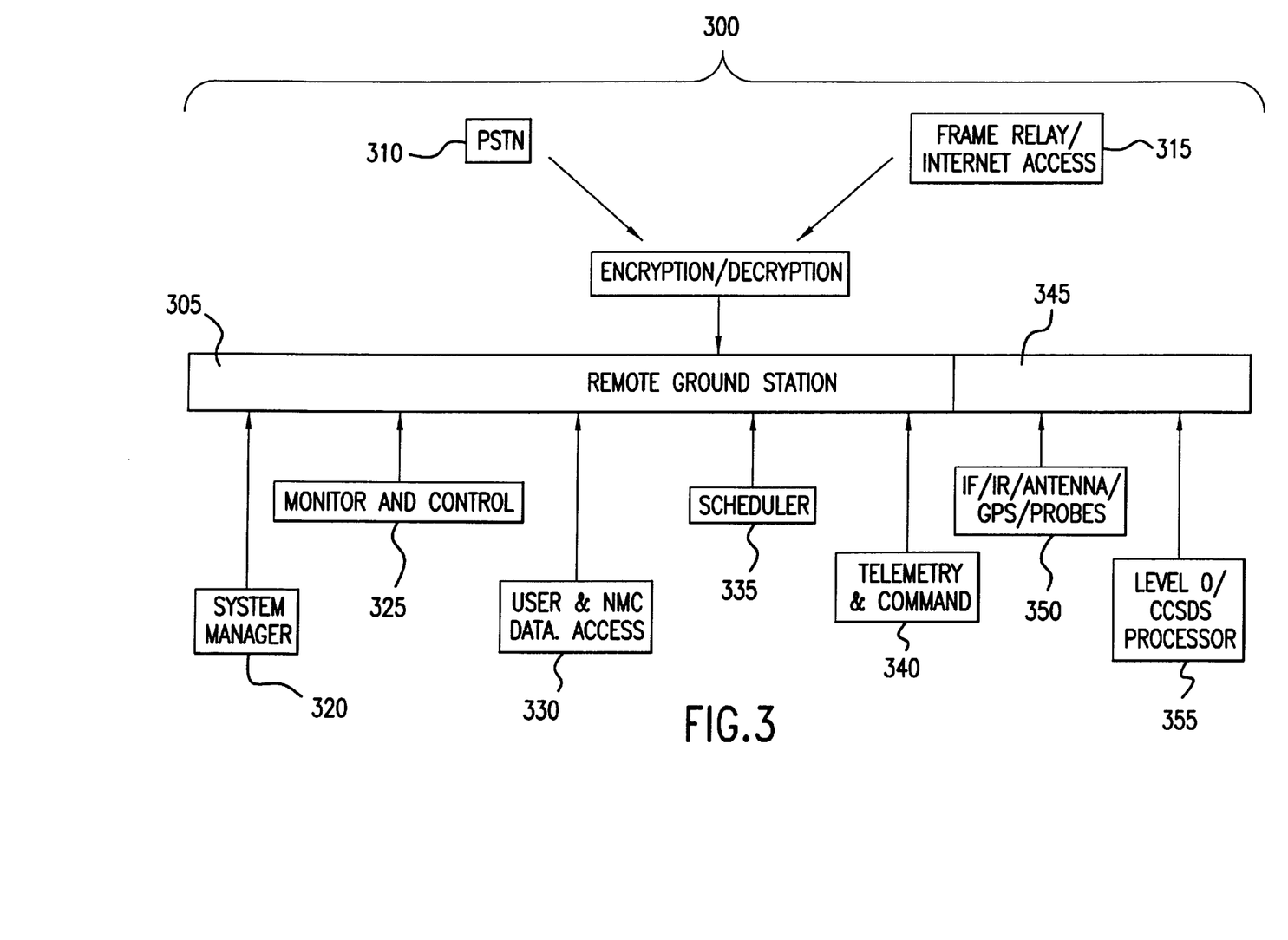
FIG. 3 is a functional diagram of the Remote Ground Station.

Turning now to FIG. 3, a discussion will be presented of the functional design of the Remote Ground Station 300. The functional core of the Remote Ground Station 300 is the Remote Ground Station System Server 305, which is typically implemented as a Unix, Windows NT, or similar workstation. The workstation handles all of the calculations, hardware control and sensors I/O needed to operate the Remote Ground Station System Server 305.

The Remote Ground Station System Server 305 is connected to other components of the system by communication over a Public Switched Telephone Network 310 or by communication via a Frame Relay Transmission Network 315. The Public Switched Telephone Network 310, because it is a slower communications means, is used for low priority and smaller sized transmissions and back-up communication purposes, such as administrative files, pass data and data that has not been requested to be sent real time. On the other hand, Frame Relay Transmission Network 315 operates over T1 lines and can carry much larger packets of data in real time. This means is reserved for those passes in which the user has requested real time control or real time telemetry.

Overall systems handling is controlled by the System Manger 320 which includes server backup software, Frame Relay and PSTN management and low level Unix system software.

The Monitor and Control Function 325 includes general system overhead and Remote Ground Station diagnostics.

The User and NMC Data Access Module 330 includes maintaining the GUI interface, controlling user and NMC access functions, S/C configuration, updating satellite orbit data, and maintaining the RGS database.

The Schedule Module 335 takes orbit information and the pass schedule from the NMC and generate antenna track sequences, station configuration plans and user interface plans for each pass. all pre-pass and pass events are directed and managed by the schedule Module. The information needed by the Schedule Module 335 are obtained via the Public Switched Telephone Network 310 or the Frame Relay Transmission Network 315.

The Telemetry and Command Module 340 handles the actual real time communication with the satellite and all other necessary data processing operations, include the uplink of command data and the downlink to telemetry data. Pass data is stored and forwarded according to the user configured pass configuration file.

Three minutes before each scheduled pass the Telemetry and Command Module 340 configures all necessary communication gear to match the intended satellite and pass requirements, a final check is performed, the antenna is slewed to the required position and data acquisition begins. A number of real time data can be passed immediately back to the user if the pass has been so configured. A combination of the telemetry and ancillary pass data is stored at the Remote Ground Station 120 until such time as a confirmed copy has been transferred to the Customer Site 150 or the Network Management Center 140.

The Remote Ground Station System Server 305 includes a series of Hardware I/O Interface Connections 345, such as a PCI bus, IEEE bus, and an RS232 port. These Hardware I/O Interface Connections 345 allow various external sensors, monitors, receivers and test equipment to be connect to the Remote Ground Station System Server 305.

One group of the these sensors, collectively called the IF/IR/Antenna/GPS and Probes 350 gather various types of local data including all forms of meteorological data, internal hardware operating parameters, radio frequency diagnostics, power amplifiers, etc.

A second group type of function is directed toward the frame relay communication requirements. The Level 0/CCSDS Processor 355 handles the low level packet processing for the Monitor and Control Function 325 function. Such functions include frame synchronization and Level 0 processing, which is the separation of the data stream into the various types of data being transmitted.

It should be understood that although the present invention has been discussed in terms of communicating with orbiting satellites, it can also be used to communicate with spacecraft, rockets, moons, planets, asteroids, satellites in geostationary orbits, satellites in Low Earth Orbits, and other natural and man-made objects that can configured in such a manner as to be able to communicate with the present invention. Thus all references to satellites or orbiting satellites shall be considered to include all of the above listed items.

The foregoing description shows only preferred embodiments of the present invention. Various modifications are apparent to those skilled in the art without departing from the scope and spirit of the present invention. Therefore, the embodiments shown should be considered to be illustrative, not in any manner restrictive.

What it is claimed is:

1. A shared communication apparatus for communicating user data between a plurality of independent satellite users and their respective orbiting satellites, said apparatus comprising:

a) a user interface, one for each of the plurality of independent satellite users, gathering user data to be transmitted to a user selectable one of the plurality of orbiting satellites from one of the plurality of independent satellite users;

b) a central controller coupled to the user interface, receiving the user data to be transmitted, interacting with the one of the plurality of independent satellite users via the user interface to enable the one of the plurality of independent satellite users to control the satellite to which the user data is to be transmitted and/or satellite data is to be received, to determine a time at which the user data is to be transmitted and/or satellite data is to be received, c) a plurality of remote ground stations, each ground station having:
      (i) a transmitter receiving the user data to be transmitted, transmitting the user data to the user selectable one of the plurality of orbiting satellites, and
      (ii) a receiver receiving the satellite data for the one of the plurality of independent satellite users from the user selectable one of the plurality of satellites, and communicating the satellite data to the user interface or the central controller, wherein the central controller interacts with the one of the plurality of independent satellite users to control from which of the plurality of remote ground stations the user data is to be transmitted and/or satellite data is to be received; and d) a communications network maintaining communications between said user interface, said central controller, and said plurality of remote ground stations via which the satellite data and the user data is transmitted to and from the plurality of independent satellite users and the plurality of remote ground stations.

2. The shared apparatus according to claim 1, wherein the user interface comprises a graphical user interface.

3. The shared communications apparatus according to claim 1, wherein central controller includes a computer.

4. The shared communications apparatus according to claim 1, wherein said communications network comprises a public switched telephone network, which is used for low priority and small sized transmissions, and a frame relay transmission network, which is used for large packets of data being transmitted in real time.

* * * * *

UNITED STATES PATENT AND TRADEMARK OFFICE
CERTIFICATE OF CORRECTION

PATENT NO. : 5,940,739
DATED : 17 August 1999
INVENTOR(S) : Charles CONRAD et al.

It is certified that error appears in the above-identified patent and that said Letters Patent is hereby corrected as shown below:

| Column | Line | |
|---|---|---|
| 1 | 8 | Change "Every" to --Ever--. |
| 1 | 16 | Change "specially" to --special--. |
| 1 | 17 | Change "phenomenon" to --phenomena--. |
| 1 | 18 | Before "two" delete "a"; change "type" to --types--. |
| 1 | 59 | Change "Televisions" to --Television--. |
| 2 | 2 | Change "had be" to --had to be--. |
| 2 | 24 | Before "only" delete "a". |
| 2 | 42 | Before "provide" insert --to--. |
| 2 | 47 | Change "onto" to --on to--. |
| 2 | 48 | Change "as" to --at--. |
| 3 | 5 | Before "transmitted" change "the" to --then--. |

UNITED STATES PATENT AND TRADEMARK OFFICE
CERTIFICATE OF CORRECTION

PATENT NO. : 5,940,739

DATED : 17 August 1999

INVENTOR(S) : Charles CONRAD et al.

It is certified that error appears in the above-identified patent and that said Letters Patent is hereby corrected as shown below:

| Column | Line |  |
|--------|------|--|
| 3 | 15 | Delete "during". |
| 3 | 35 | Before "transmitted" insert --be--. |
| 3 | 44 | Before "by" insert --is--. |
| 3 | 51 | Change "available" to --access--. |
| 3 | 58 | Change "are" to --is--. |
| 3 | 65 | Delete "in". |
| 4 | 7 | Change "compute" to --computer--. |
| 4 | 31 | After "can" insert --be--. |
| 4 | 53 | Change "radios" to --radio--. |
| 4 | 59 | Change "Site" to --Sites--. |
| 4 | 67 | Change "Satellites" to --Satellite--. |

UNITED STATES PATENT AND TRADEMARK OFFICE
CERTIFICATE OF CORRECTION

PATENT NO. : 5,940,739
DATED : 17 August 1999
INVENTOR(S) : Charles CONRAD et al.

Page 3 of 4

It is certified that error appears in the above-identified patent and that said Letters Patent is hereby corrected as shown below:

| Column | Line | |
|---|---|---|
| 5 | 19 | Change "A" to --At--. |
| 5 | 20 | Change "Satellites" to --Satellite--. |
| 5 | 32 | After "order " insert --to--. |
| 5 | 39 | Change "Satellites" to --Satellite--. |
| 5 | 42 | Change "Satellites" to --Satellite--. |
| 5 | 50 | Change "customer wishes" to --customers wish--; before "real" insert --in--. |
| 6 | 24 | Change "generate" to --generates--. |
| 6 | 26 | Change "all" to --All--. |
| 6 | 33 | Change "include" to --including--. |
| 6 | 53 | Change "nect" to --nected--. |
| 6 | 54 | After "group of" delete "the". |

UNITED STATES PATENT AND TRADEMARK OFFICE
CERTIFICATE OF CORRECTION

PATENT NO. : 5,940,739
DATED : 17 August 1999
INVENTOR(S) : Charles CONRAD et al.

It is certified that error appears in the above-identified patent and that said Letters Patent is hereby corrected as shown below:

| Column | Line | |
|---|---|---|
| 6 | 55 | After "350" insert --,--; change "gather" to --gathers--. |
| 7 | 4 | After "can" insert --be--. |

Signed and Sealed this

Thirteenth Day of June, 2000

Attest:

Attesting Officer

Q. TODD DICKINSON
Director of Patents and Trademarks